(12) United States Patent
Goodman et al.

(10) Patent No.: US 7,039,930 B1
(45) Date of Patent: May 2, 2006

(54) TELEVISION ADVERTISING AUTOMATED BILLING SYSTEM

(75) Inventors: Rodney M. Goodman, Altadena, CA (US); Karen Emerson, Long Beach, CA (US); Jeffery Dickson, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/528,479

(22) Filed: Mar. 17, 2000

Related U.S. Application Data

(62) Division of application No. 08/979,838, filed on Nov. 26, 1997, now Pat. No. 6,173,271.

(51) Int. Cl.
*H04H 9/00* (2006.01)
*H04N 7/16* (2006.01)
*H04N 7/00* (2006.01)
*H04N 11/00* (2006.01)
*G06Q 40/00* (2006.01)

(52) U.S. Cl. .............................. 725/22; 725/1; 725/20; 725/32; 725/144; 725/151; 705/14; 705/40; 348/460; 348/461; 348/467; 348/473; 455/2.01

(58) Field of Classification Search .................. 725/20, 725/22, 1, 32, 144, 151; 705/14, 40; 348/460–461, 348/467, 473; 455/2.01
See application file for complete search history.

(56) References Cited

U.S. PATENT DOCUMENTS

| | | | | |
|---|---|---|---|---|
| 4,170,782 A | * | 10/1979 | Miller | 725/22 |
| 4,230,990 A | * | 10/1980 | Lert et al. | 725/22 |
| 4,547,804 A | * | 10/1985 | Greenberg | 348/461 |
| 4,720,873 A | | 1/1988 | Goodman et al. | |
| 4,945,412 A | * | 7/1990 | Kramer | 348/461 |
| 4,967,273 A | * | 10/1990 | Greenberg | 725/22 |
| 5,200,822 A | * | 4/1993 | Bronfin et al. | 725/22 |
| 5,319,453 A | | 6/1994 | Copriviza et al. | |
| 5,355,161 A | * | 10/1994 | Bird et al. | 725/22 |
| 5,425,100 A | * | 6/1995 | Thomas et al. | 725/20 |
| 5,450,122 A | * | 9/1995 | Keene | 725/22 |
| 5,450,134 A | | 9/1995 | Legate | |
| 5,526,427 A | * | 6/1996 | Thomas et al. | 348/467 |

(Continued)

OTHER PUBLICATIONS

"Television VBI Data Communications Systems", Closed Captioning & Datacasting, *EEG Enterprises, Inc.*

*Primary Examiner*—John Miller
*Assistant Examiner*—Michael W. Hoye
(74) *Attorney, Agent, or Firm*—Fish & Richardson P.C.

(57) ABSTRACT

Advertising is marked with a code in a way which makes it difficult to fool the system. The advertising is marked with a code at the time the advertising is produced. Then, when the advertising is broadcast, the code on the advertising is analyzed. Different security measures can be used, including producing the code in the closed captioning so that many different people can see the code, or comparing codes in one part of the signal with a code in another part of the signal. Measures are taken to prevent the code from being used to detect commercials. According to another part of this system, a paradigm for a clearinghouse is disclosed in which the user signs up with the clearinghouse, obtains a line of credit, and the advertiser, the agency, and the ad producer also subscribe to the service. When the ad is actually aired, the payment can be automatically transferred.

1 Claim, 15 Drawing Sheets

U.S. PATENT DOCUMENTS

| | | | | |
|---|---|---|---|---|
| 5,584,050 | A | * | 12/1996 | Lyons ........................ 455/2.01 |
| 5,646,675 | A | * | 7/1997 | Copriviza et al. ............. 725/22 |
| 5,708,477 | A | * | 1/1998 | Forbes et al. ................ 348/552 |
| 5,774,170 | A | * | 6/1998 | Hite et al. .................... 725/34 |
| 5,826,165 | A | * | 10/1998 | Echeita et al. ................. 725/22 |
| 5,917,912 | A | * | 6/1999 | Ginter et al. ................. 705/40 |
| 6,002,393 | A | * | 12/1999 | Hite et al. ..................... 725/34 |
| 6,469,749 | B1 | * | 10/2002 | Dimitrova et al. ............ 725/22 |

* cited by examiner

TELEVISION ADVERTISING AUTOMATED BILLING SYSTEM

This application is a division and claims the benefit of priority under 35 U.S.C. §120 of U.S. patent application Ser. No. 08/979,838, filed on Nov. 26, 1997, now U.S. Pat. No. 6,173,271 which is incorporated herein by reference.

FIELD OF THE INVENTION

The present invention relates to a media advertising automatic billing system which automatically and securely maintains an exact tracking of advertisements which are played and produces billing information for those advertisements.

BACKGROUND OF THE INVENTION

Commercial advertising ("commercials") create the revenues that sustain the content provider's operation. Commercials provide a host of special problems based on the nature of the media.

Specifically, media such as television and radio sell specific time slots for playing of the advertisement. The content provider, e.g., the television station, sells a time slot in which a commercial will be played.

This arrangement creates special considerations. The station is selling time. Once that time passes, the value of the service goes to zero. Similarly, after the commercial plays, there is no way of unplaying it. This compares with other sellers of commodities, who often have the option to repossess the chattel being sold.

Because of these considerations, most stations require that payment for booking be entirely in advance, except for the best, i.e, the most creditworthy accounts.

The most typical advertisement includes regular television commercials, typically thirty to sixty seconds in length, which are aired during breaks in commercial television programs. The so-called infomercial is also a television commercial advertising, but is typically much longer in length, e.g. between four minutes and one hour.

With the exception of certain public service-oriented advertising, all commercials are paid for by a sponsor. The billing is done on a per-piece basis, based on the time and likely audience for the commercial. This pricing is a multi variable determination. For example, a one-minute commercial aired during the Super Bowl is considerably more expensive than a one-minute commercial aired at 2:00 A.M. Therefore, it is extremely important that the time when the commercial airs is the same time as what was paid for. However, it is not always a routine matter for the station to determine this.

A nationwide television commercial is often received by the television station, e.g., via its satellite transponder hookup. A "nationwide" television commercial is often included as part of the nationwide program. In this case, the central network provider provides both the television program and some of the commercials to be aired everywhere. However, other breaks within the commercial television program may be filled by "local" commercials, those that are aired only locally. These local commercials are typically produced locally, recorded and stored at the television station.

Nationwide programming time schedules for the affiliates are sent to local television affiliates from the network. This includes a schedule describing open times for local advertisement station identification and other time slots that the station can sell locally. Each half hour slot generally has two programming slots of 12 minutes duration with commercial slots in between. The national schedules also often leave half hour time slots open for infomercials or public access programming. Television guides often show these slots as "paid programming".

Depending on various circumstances, the local television station may have the option to override the national commercial. At times, the local station overrides the national commercial even when such an override is not authorized. This provides a significant problem of tracking which commercials have been shown and when.

The advertiser may pay in advance for a half hour to be aired at 7:30 P.M., but the commercial actually airs at 10:00 P.M. These times may have radically different prices. The price of a commercial aired at 9:02 P.M., which is after the show that aired in the 8:30 to 9 time slot can even be significantly different from the price of a commercial aired at 8:58 P.M., which is during that time slot. The advertisers are, therefore, extremely interested in knowing the precise time of airing. However, the varied nature of the advertising system, and especially the television system often makes it difficult to determine precisely when the commercial will be aired.

Typically, the advertising agency acts as an intermediary between the actual advertisers and the television station. The advertiser wants their advertisement to air at certain times on certain channels and in certain events. For example, a toy company might want their advertisement to air during the Sunday morning cartoons. Airing the advertisement during Sunday football would not reach the desired audience.

Special prices are often negotiated based on whether the advertisement is in prime time, off prime time, holidays, weekends, special events or the like.

At some time before the actual airing of the broadcast, the station produces an actual program schedule which show the programming segments it will play or receive, as well as all commercials, infomercials and station identifications. Each of the latter are stored on tape which are pulled from the video library by a station engineer. Commercials and infomercials are usually manually played by the station engineer who initiates the proper tape based on a schedule in a specified time slot. The engineer keeps manual records of what has actually been done and the billing of commercial time is carried out based on these records.

The actually-played commercials are often sampled by third party organizations who employ people to watch and keep track of television commercials which are played. These people, however, cannot watch every single television commercial, and therefore only act as a sampling mechanism to determine a percentage of correct reporting by the television station and advertising agency.

One other means of commercial airing verification of digitizes one or several frames of the commercial. Then the physical airing is taped and compared to the frames. This still requires a television to receive the broadcast and a physical comparison of the frames. This method is inaccurate and again based on statistical sampling.

SUMMARY OF THE INVENTION

Recent studies have suggested that perhaps as many as fifty percent of the reported commercials are not played in their proper time. This is often because of the great demands that are placed on the station engineers. The station engineers are often simply too busy to keep accurate reports of the commercials in view of the many different demands that are placed on them. Moreover, since the scheduling process is largely fluid in nature, the reports made by these engineers are crucial. The billing and accounting is done based on these reports, and their accuracy is, as described above, difficult to ascertain.

In addition, moreover, the manual billing system described above requires a crucial part of the billing to be manually entered. This system has never been satisfactorily automated.

Added to this is the problem obtained from the nature of the system in which the commercial can't be taken back once it has been played. Hence, the stations have no effective means of repossession.

The inventors of the present invention recognized all of these problems and realized that a real-time automated system for tracking the actual commercials that were aired would effectively be a win—win situation: for not only the advertisers who would get an exact accounting of when their commercial was aired, but also the television stations who would know exactly when the commercial was aired and would secure an automated means for determining the real percentage of scheduling anomalies.

The current system of payments for commercials by the advertiser usually requires payment prior to the airing of the commercial. In addition, the TV station is often required to sign an affidavit confirming the actual airing if so required by the advertiser. An objective of the present system is to have a system that pays for the commercial on a "real-time" basis using an automated clearinghouse system. The objectives include:

i. The TV Station gets a means to receive payment for their services—which is why advance payment is the standard norm of payment terms;

ii. The advertising agency gets a means to receive payment for their services—a commission for the actual airing of time booked by the agency; and iii. The advertiser (Sponsor) gets a means to insure airing of a commercial at the agreed-upon time and price.

Each entity wants accurate accounting of the commercial in addition to a more efficient, less cumbersome process of the payment transaction with reduced collection cost. This system describes a clearinghouse system to meet all of these objectives.

In view of the above, the inventors have provided a system which marks the commercials in a way that ensures secure and unambiguous identification of the subject matter. Each commercial is played by the television station including a secure identification. That identification is received, date and time confirmed, and verified. The information is sent to a billing computer.

The security is enhanced in this system. One embodiment uses a cryptographic system. Another uses a system which restricts access to the hardware.

A cryptographic system can be used to ensure that the information has not been tampered or faked. This provides the billing computer with a secure, computer-manipulable record indicating when the commercial was aired. The billing is done automatically by a computer program based on the data received from the actual airing of commercials.

The inventors also noticed a number of problems which could exist in such a system and have provided solutions to these problems also. One problem comes from the marking of commercials itself. Many have tried to analyze the content of commercials, so that such commercials could be automatically identified by an electronic circuit. Such an electronic circuit would then presumably either blank the commercials or turn off the video recording device so that the show could be watched in its entirety without commercials. Naturally, the advertisers are very hostile to the existence of such a system, since this would defeat the effect of their paid-for commercial time. A code on each commercial would be a sure way of detecting such a commercial. Therefore, the system preferably includes a way to avoid detection of the commercial. One way is by removal of the code prior to airing.

Another problem is the possibility of dishonest television stations or billers. A secure system requires that non authorized persons be prevented from tampering with the detection or improperly or falsely providing the detection. In view of the above, the inventors have devised embodiments which include special encryption techniques that are used which make it difficult for an unauthorized party to properly code the commercial in a way that would fool the billing computer.

Another system correlates content of the commercial with the billing system to avoid the possibility of simply copying a code from one commercial on to another.

Another system adds some measure which prevents using this system to detect whether program content is a commercial.

The present system, titled the "ADTAG" system, uses a clearinghouse concept. Once the billing information is collected via the tracking system, a settlement between the advertiser, the advertising agency, and the TV or radio station is made via electronic means such as a modem or the Internet. This settlement is an accounting of the transaction and payment for the transaction between the three entities—again via electronic means.

The ADTAG clearinghouse system includes a verification portion which verifies in real time that a commercial has actually been aired, along with verification of the time when the airing occurred. This information is used to authorize payment if all information matches or to initiate an error resolution procedure if the information does not match.

BRIEF DESCRIPTION OF THE DRAWINGS

All of these will be described in detail with reference to the accompanying drawings wherein.

DESCRIPTION OF THE PREFERRED EMBODIMENTS

The present specification describes billing for an advertisement which is broadcast over a medium. The medium could be of any type. Television is described as the preferred embodiment of the medium.

Video sent over a channel is often transmitted using the teletext standard, which is a packet transmission method for transmitting video. The video is formed of a number of pixels arranged in lines. The lines are used to transmit the digital information.

Each line is transmitted from the left side of the screen to the right side of the screen. The cursor that writes the information thereafter needs to move from the right side of the screen back to the left side of the screen. The display is blanked during this time of retrace. This time is referred to as the vertical blanking interval or "VBI". Information can be stored in these times of retrace.

The NTSC video standard uses 525 lines with VBI lines in lines 6 through 21 and lines 258 through 273. Some of these lines are already in use for other functions. For example, VBI line 21 includes codes that are indicative of closed captions.

Figure 3:
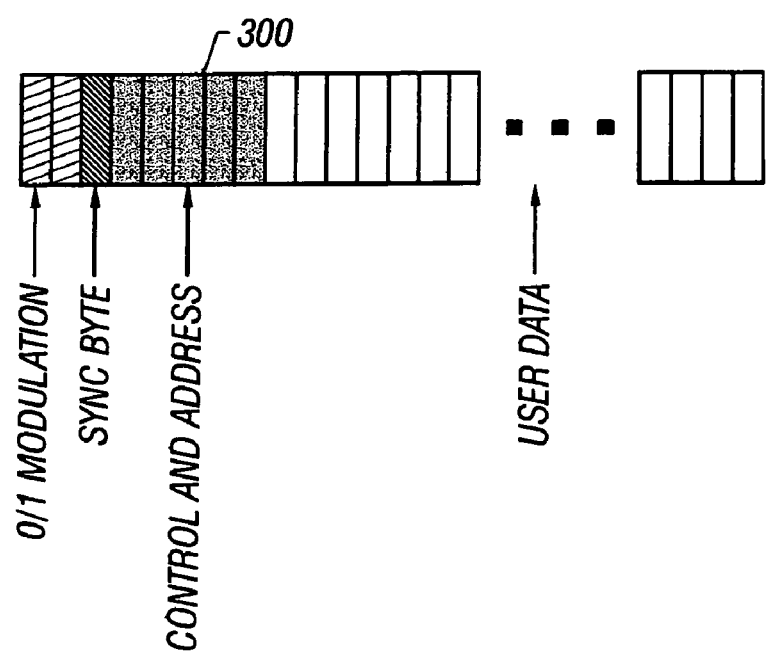
FIG. 3 shows a diagram of the teletext-text packet system.

FIG. 3 shows the contents of the teletext packet. The control bytes 300 include header information that identifies the contents of the user data that includes the ADTAG packet. This allows the system to mark the data as proprietary to avoid confusion of other teletext receivers by using a unique code.

The user bytes are encoded in order to ensure reliable transmission. The present system uses one or more VBIs per full frame of video. The raw data frame without forward error control includes 28 bytes per packet (8 bits per byte, sixty packets per second=1340 bits per second) requiring a data transmission speed of 13.44 kbs.

A preferred forward error correction system includes the single error correcting double-error detecting Hamming code. Many other codes could be used.

This allows a true reliable data rate of 6.72 kilobits per second. Therefore, for example, in the space of time taking up a 30 second television slot, approximately 200,000 bits of reliable information can be delivered. Standard DES with 64, 128, or 256 bit keys could be used. Preferably, the system also uses some correlation technique that correlates the code with the commercial in a way that prevents simply copying the code from one commercial to another.

Figure 1A:
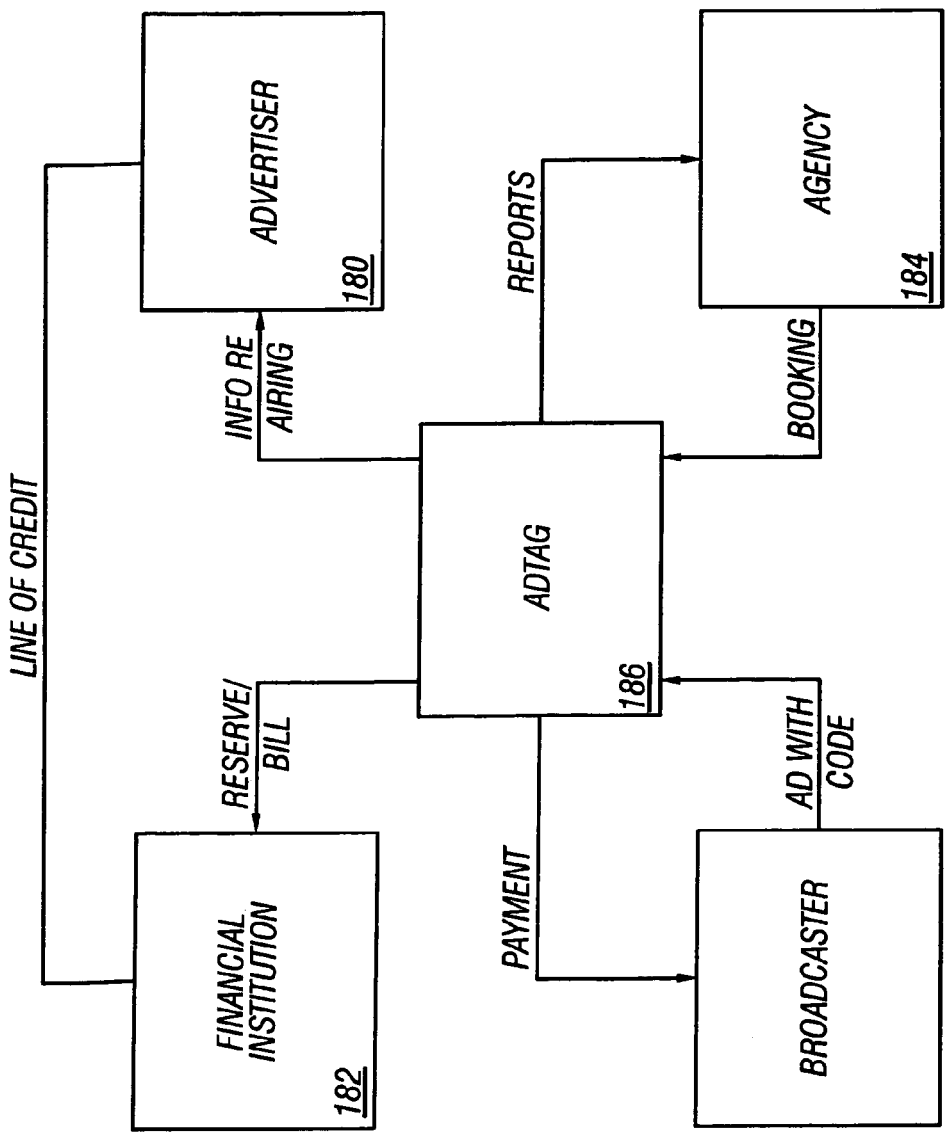
FIG. 1A shows a block diagram of the clearinghouse of the present invention.

The clearinghouse system is illustrated in FIG. 1A. To use the system, an advertiser 180 usually first obtains a line of credit for advertising from a financial institution 182. This can be considered roughly analogous to a VISA card. The financial institution assigns an account number and credit limit. This account number will be used for charging later advertisements. The user then joins the ADTAG clearinghouse 186.

The ad agency 184 then books a commercial by obtaining the advertiser's account code along with other information about the advertisement. The booking information may include:

Booking Information
Agreed upon air date and time, duration of commercial
Advertiser account code
TV station account code
Tape name and production date
Ad agency account code
Agreed upon pricing and commission This information is usually obtained by the ad agency. However, larger advertisers can have their own in-house booking departments that could sign on to ADTAG directly. ADTAG then takes this information and develops reports for each entity based on the service agreement signed with ADTAG. Reports will be for that entity only—i.e., ad agency #1 can only get information related to ad agency #1 and not for any other entity. Reports can be generated including:

Conflicts in scheduled time
Daily, weekly, monthly booking report for planning purposes
TV stations booked
Booking by advertiser.

The ad agency also joins the ADTAG clearinghouse system and agrees to abide by its program guidelines. The ad agency books a commercial or time slots with the ADTAG clearinghouse for its customer. The agency enters its account code, the customer accounts code, pricing for the commercial and the agency's commission code into the clearinghouse data base. At this point a reserve is entered onto the advertiser's credit line—similar to the way in which car rental firms and hotels put a reserve on a credit card when you rent a car or room. This reserve is removed by ADTAG when actual airing data is received or the air date time has expired.

ADTAG provides reports and information on a real time basis back to the ad agency, TV Station, and advertiser, based on the level of service selected by each entity.

When a commercial is played, ADTAG also decides if the commercial has been played at the precise same time as what was booked. If so, ADTAG "verifies" the playing, and "authorizes" payment from the bank. If not, the system initiates error resolution procedures.

An advertisement is made by digitally encoding certain information onto the tape which will be used to air the advertisement. Tape encoding will be provided by ADTAG or an ADTAG endorsed duplication house. The encoding is done on the master tape of the commercial production. In that way, any tape duplicated off the master tape will include all the proper coding. In addition, ADTAG uses some kind of verification of security. This can be an encrypted code on the tape, and/or requiring secure premises and secure handling of the tape. The tape is then sent back to the advertiser (sponsor) or to whomever the sponsor authorizes. This is the first part of the security system. This information preferably includes, for example:

the advertiser's ADTAG account code:
The name of the tape
Date the tape was produced
Last date the tape should be used
Certain copyright information
Any other information about the tape which may be useful.

The information is preferably digitally encoded in some way associated with the advertisement that is actually playing during the advertisement.

The ADTAG code is included on the tape by a secure encoder.

This can be done as follows:

a) The preferred technique uses ADTAG in a secure premises. The master tape is sent to ADTAG who adds the code. The master tape is returned including the duplicating code, and sent to the duplication house and then on to the TV stations. This allows keeping the encoder only at secured premises. Powerful one-time-pad codes can be used in this case, e.g., where only the ADTAG computer knows the key.

A possible disadvantage is that this system requires one extra recording and this may reduce the quality of the master. An all-digital system can be used to minimize any such degradation.

b) ADTAG-produced encoder boxes that are sent to any person who wishes to put ADTAG codes on a master tape. The encoders use an encryption scheme. This alleviates the problem of requiring an extra recording. But this has a possible problem that the encoder boxes could be subverted if the code is broken.

The preferred technique uses the digital encoding of the information into the vertical blanking intervals in a secure manner using a key encryption system. This system that is used needs to be secure and able to detect attempts to tamper with the code.

c) An alternate technique encodes information as part of the closed captioning part of the commercial. This can be readable information, e.g., the first line of text of closed captioning can be used to identify the commercial.

The security in this case comes from the literally thousands of people who will see the captions.

The tape is sent to the television station which sets it up for play matched to the station production schedule.

The station also may include an ADTAG decoder receiving the actual broadcast information. The ADTAG decoder recognizes and/or strips the ADTAG code.

Three embodiments of the ADTAG decoder are described. All require an ADTAG decoder which will decode the ADTAG information and accumulate the billing data for downloading to ADTAG. The ADTAG decoders are preferably tamper proof boxes, which are, for example, potted in epoxy, and/or formed with an electronic jumper which automatically erases memory contents when the box is opened. Each have unique ID's (keys) stored in areas of nonexternally-readable ROM blown into the microprocessor.

The code can be used in three ways:

1) The ADTAG code is broadcast with the commercial. This has the possible disadvantage noted above that the commercial may be identifiable.

A major advantage of this system is that the ADTAG decoder does not reside at the TV station, but can reside at a remote (secure) ADTAG site 184 that is monitoring the broadcasts of the TV station. Only those advertisements which are actually broadcast, therefore, are detected.

Certain countermeasures described below could be used to avoid detection of the commercials.

If the code uses a part of the closed captioning, this is also unlikely to be usable as a means to detect codes, since the closed captioning occurs on many different types and areas of programs.

2) Alternatively, the ADTAG code is stripped off and detected. The VBI lines used are returned to black before the video is broadcast out.

Here, the ADTAG decoder resides at the TV station, and in series with the live feed. Hence this is a potential degrader of signal quality. It is also subject to "spoofing" by technicians at the station. Hence, one could feed a completely false video stream to the ADTAG box and a completely separate video stream to broadcast.

This could be alleviated by having the ADTAG box monitor the transmission of the TV station by, i.e., including a receiver and matching the claimed live feed to the received live feed. It is difficult, however, to make this system completely secure.

Advantage: nothing is broadcast in the VBI so commercial detection in this way becomes impossible.

3) Another embodiment uses the ADTAG box to add the code to ALL lines including programming, and all lines are broadcast with a code which only ADTAG can decode. Hence if the ADTAG box detects this is an ADTAG coded commercial, it allows the code to pass through after date/time modification. If it detects no ADTAG code it adds a random code to the line. The disadvantage is that the ADTAG box is in series with the live video feed as in b. above. There are two major advantages: 1) as in the above, the ADTAG monitor can be at a remote site and hence secure. 2) The commercial cannot be distinguished from regular programming.

Another possible problem is spoofing by a malicious TV station. That is simply copying the valid ADTAG codes and splicing them onto some other programming, or other commercial tape. They could not read the content of the tape—but copying is easy.

But why would the TV station want to do this? This could make it possible to take the ADTAG codes from a 3-minute COKE commercial and splice them onto a 3-minute PEPSI commercial. Thus ADTAG would allow COKE to pay the bill, and the TV station would also collect from PEPSI.

According to the present invention, counterfeit prevention techniques are used. A first technique links the actual picture content to the ADTAG code.

A technique of characterizing pictures in current programming can be used. For example, one method extracts a quantity such as the average picture brightness level over the last X frames and adds that to the ADTAG code.

For example, this system uses a capacitor or integrator to compute the average brightness level over a line. That analog value is converted to digital and added to the encrypted code.

A sigma-delta ADC could do this all in one operation. Simple pasting of the code onto a different video would then only work for a video with the same statistics as the original. The actual method does not need to be terribly robust. The A/D need only be at most 3 bits, maybe only 1 bit, e.g., a comparator which compares the average brightness to a threshold. But taken over ALL the lines there is a lot of information. The confidence factor can be changed by increasing the accuracy. Other characteristics could also or alternatively be samples, such as audio, or other more complicated aspects of the picture, including numbers of objects, histogram of colors in the image.

The close captioning embodiment uses identifying information in the existing close captioning lines. Thus, the ADTAG tape would have close caption information, plainly readable, e.g., this is a COKE commercial AD#23456 3 minutes . . . END of AD#23456, etc., etc. which would be broadcast out in the clear.

A disadvantage is that anyone can read the info and one can tell the commercial slots. But it has the big advantage that if many people are watching the close caption data, it becomes difficult to change it without detection. If millions of people see a Wally's painting advert on the picture, while COKE is on the close caption data, the phones will ring. Thus, third party verification is possible and spoofing becomes impractical.

Yet another technique uses existing cryptographic techniques to digitally sign the code.

In addition, the ADTAG decoder 141 verifies that the tape was actually broadcast 142 as data is being collected and stripped. Verification of the broadcast is included in the stripped data sent to ADTAG database computer. An alternative to stripping the codes prior to broadcast is to leave the codes on with the broadcast and allow a third party verification of the broadcast with the codes.

When a commercial is aired with associated ADTAG information, the decoder 141 gathers the information from the tape using code stripper 146, and adds to that information a date and time stamp from real time clock 148, booking code, ADTAG account code security code and time length of the commercial. Therefore, this information stripped from the ADTAB decoder attached to the live broadcast feed line of the TV station includes:

ADTAG security code (i.e., ADTAG encoded on the master tape)
TV station code
Broadcast verification code
Tape name
Advertiser code
Tape production stale date
Date, time and length of airing This combined information is sent to the billing computer 162.

Figure 1B:
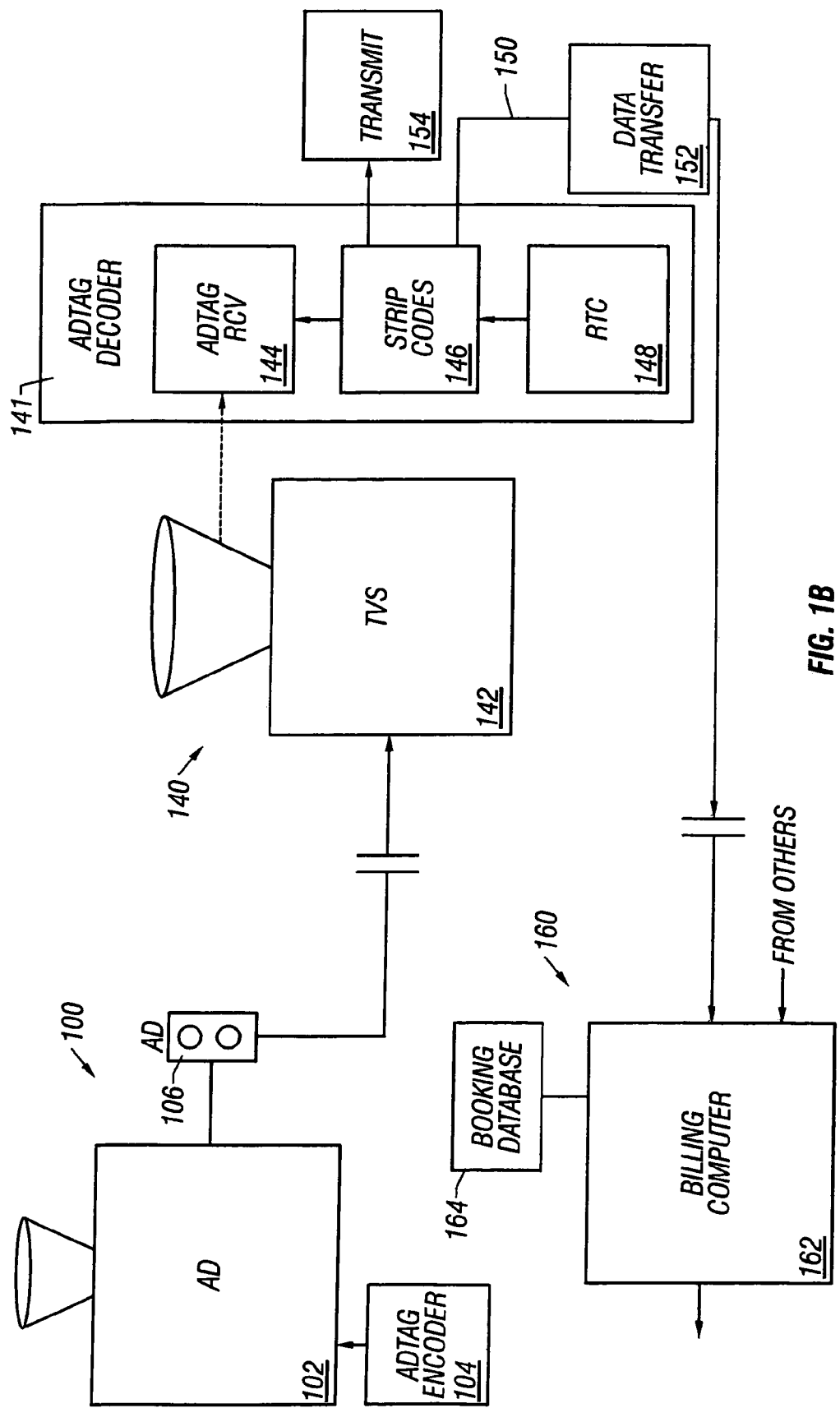
FIG. 1B shows a basic block diagram of the overall system of the present invention.

The added information is preferably stripped prior to actual broadcast of the live feed as shown in FIG. 1B. This is done to avoid the possibility, as described above, of providing an icon from which a commercial can be automatically detected. It is important, however, that the information be received while it is actually being transmitted, to ensure real time reception of the advertisement. The central system then matches the following information to its booking system, and provides automatic billing.

If a match is accurate, then the billing system batches the transaction. Later, the system initiates via either modem or Internet:

A banking transaction to remove the reserve from the credit line;

Another banking transmission to add the total amount due to the advertiser;

Another modem transaction to provide advertising agency's cut of this transaction.

An alternative scenario is where there is a problem with the actual airing or with the airing not matching the booking in the system.

All of this functional information will be described in further detail with reference to the remainder of the disclosure.

The basic block diagram of the overall system is shown in FIG. 1B. This block diagram shows the system of stripping the codes at the broadcasting station, shown here as a TV station, prior to transmission. The three major components of the system include production of the advertisement at 100, airing of the advertisement at 140, and billing of the advertisement at 160 using the ADTAG clearinghouse shown in FIG. 1A.

The advertisement is formed by advertising material 102. The advertising material is encoded with special ADTAG information from ADTAG encoder 104. The combined information is placed onto an advertising media 106 which is for example a video tape. The video tape is then used by the television station at 140 in order to transmit the information.

The transmitted information from TV station 140 is received by an ADTAG receiver 144 which strips the ADTAG code at 146. A real-time clock 148 is combined with the stripped codes to produce a composite stream 150 including both the codes and the real-time information. This information is transferred by a data transfer mechanism 152, for example a modem or some other TCP/IP mechanism.

The video information with the code stripped off is transmitted by transmitter 154 in the usual way.

The billing information is transferred to billing computer 162 at area 160. The billing computer compares the incoming data with information from its booking database 164. This information is then used for appropriate billing.

The FIG. 1B block diagram of the system shows the basic functionality of the system. A number of improvements and modifications are contemplated. Initially, the need for security is paramount in this system. Use of appropriate encryption is crucial for ensuring the security of the system. The encryption must be sufficiently robust to avoid falsification and detect tampering. All of the ADTAG components, including the ADTAG encoder 104, receiver and code stripper 146 and billing computer 162 preferably include encryption and decryption circuitry including the capability of determining any attempt at alteration of the code.

Although this system is described for use with television, it is equally applicable for use with any other communication system, including satellites, closed circuit television, Internet, royalty tracking, radio, or any other means. Also, while the preferred embodiment describes certain identifying information being placed in vertical blanking intervals of the video, and later removed, it should be understood that any form of data encoding which does not interfere with the viewer's watching of the actual commercial could alternately be used. A reverse stripping of the codes, where the codes are broadcasted and stripped by the radio listener and royalty trackers could also be used. Other schemes would include putting the information in the picture itself using steganographic methods. This is currently being done in still images by Digimarc™. These systems adjust portions of the image that cannot be seen with the naked eye, in a way that encodes the information.

A particularly preferred embodiment described includes information in the vertical blanking intervals along with the ADTAG codes of a number of different frames. These items of information need to agree and be correct in order to verify the information.

Figure 1C:
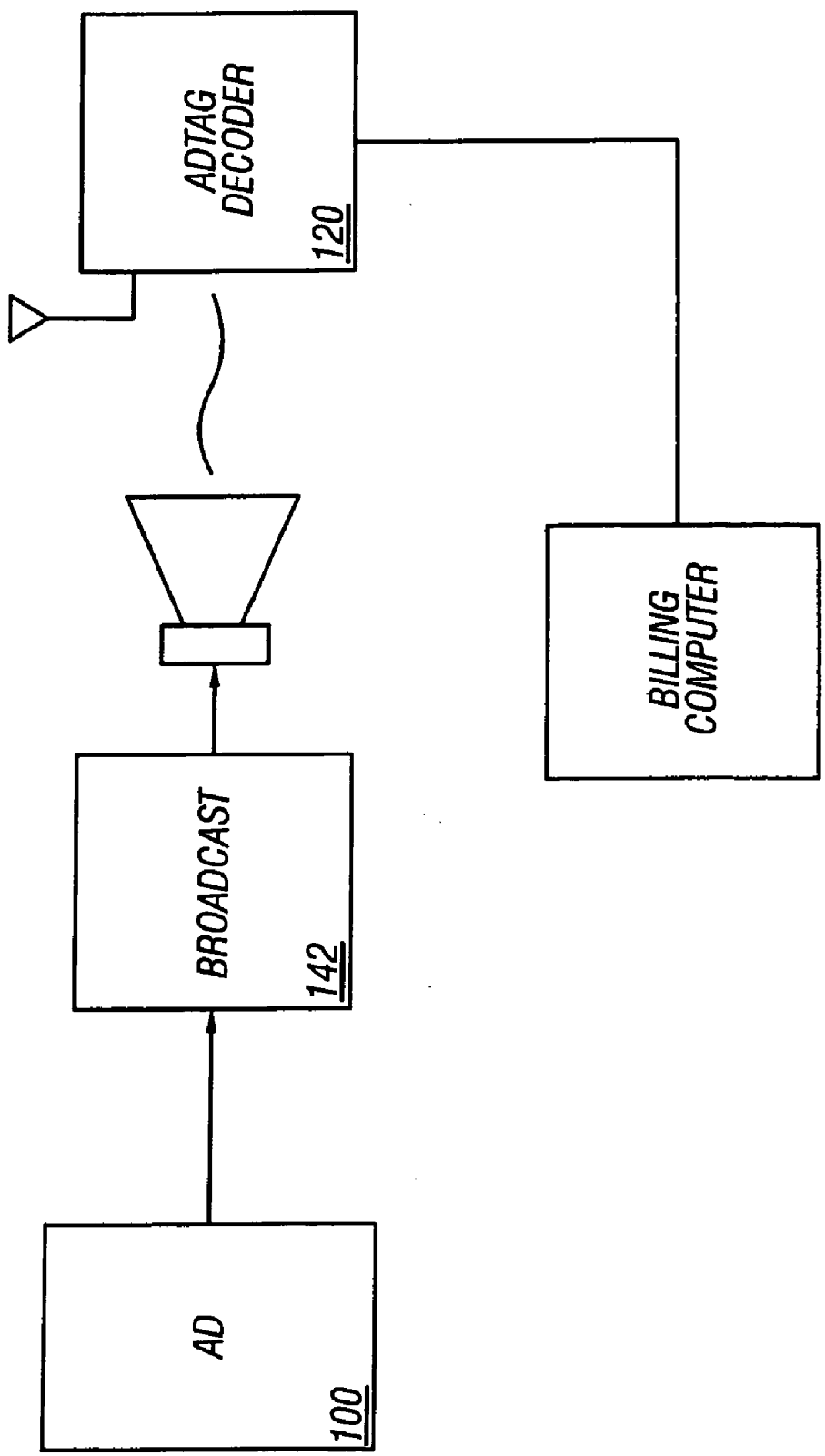
FIG. 1C shows an alterative block diagram of a different embodiment.

FIG. 1B shows the block diagram for embodiment B where the ADTAG is stripped off and detected before the video is broadcast. FIG. 1C shows an alternative block diagram for embodiment A where the ADTAG code is received a remote ADTAG site 120 which includes an ADTAG decoder stripping the codes and transferring them to the billing computer system 160.

Embodiment C also uses the same block diagram of FIG. 1C.

Figure 2:
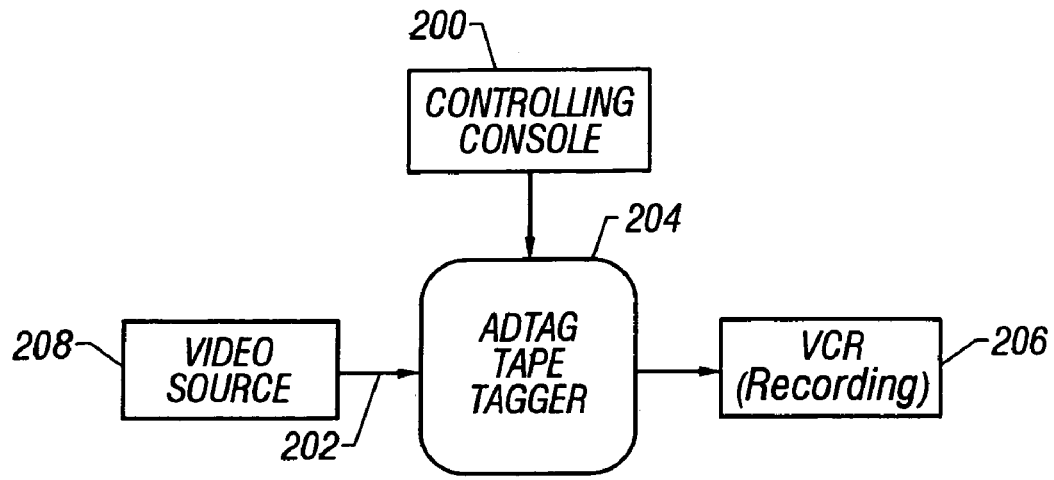
FIG. 2 shows a tape tagger.

A diagram of the tape tag encoder system is shown in FIG. 2. The tape tag encoder forms the ADTAG encoder system 104 that is used to tag video material as it is placed on storage media, e.g. tape 106, prior to broadcasting. This system is used for example at production houses, which produce the advertiser's tapes that are sent to the broadcaster.

Controlling console 200 allows input of certain data to be recorded in the tag. This data includes, for example, information about the advertisement including but not limited video information indicating the advertisement. The video 202 from video source 208 is tagged using a tape tagger element 204. The information, once tagged is recorded by a video tape recorder 206. The tape tagger 204 operates as described with reference to the schematic of FIGS. 5A and 5B to modify the teletext-encoded video.

As described above, the preferred mode operates to encode the required information into the vertical blanking interval of the video signal, e.g., the NTSC signal. Of course, it is also possible to encode the information into the video signal in other ways. The system that is described in the following explains how the information is encoded on the video signal.

Figures 1, 5A:
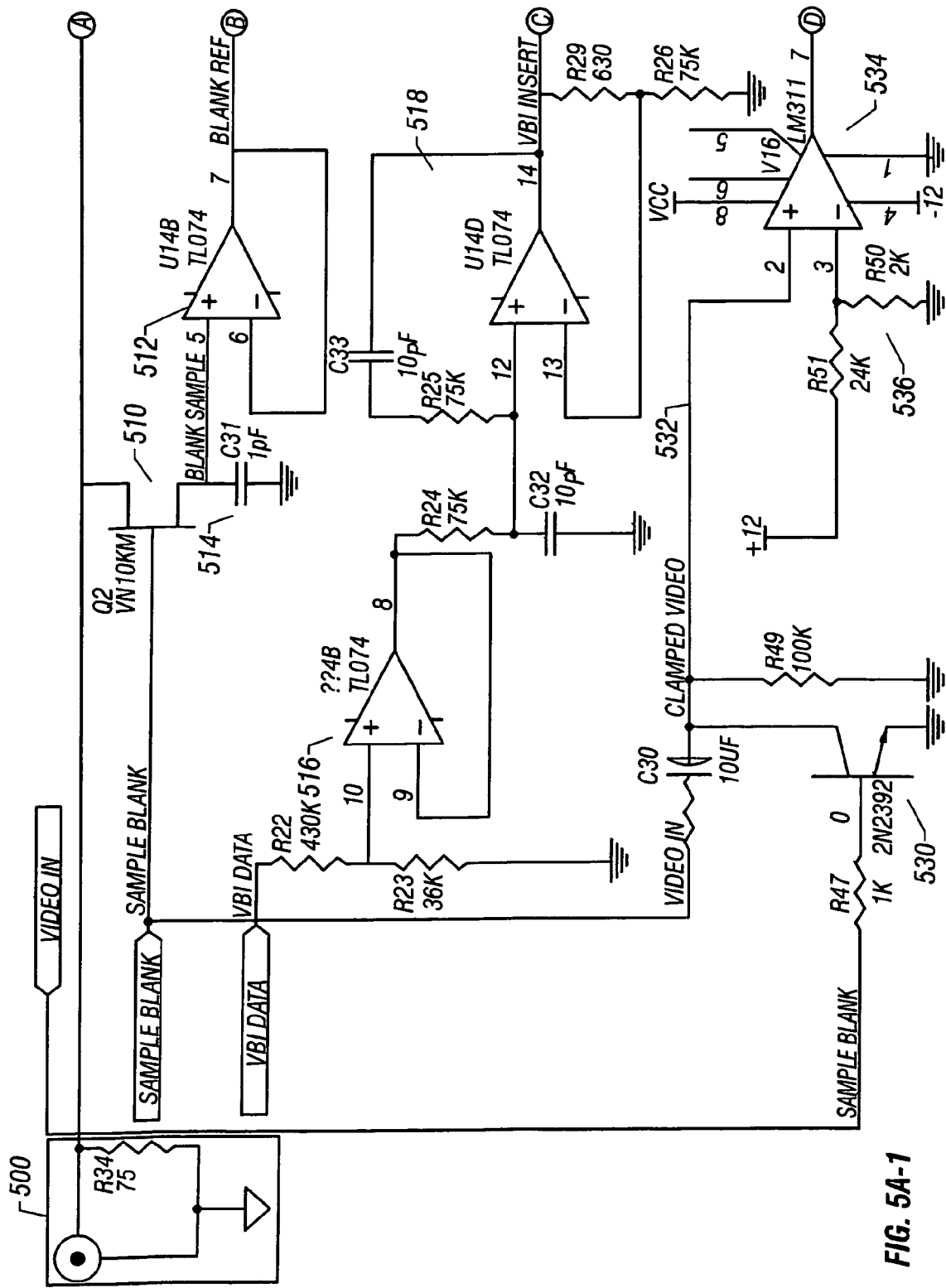
FIGS. 5A and 5B show the schematic of the preferred system of the present invention.
Figures 2, 5A:
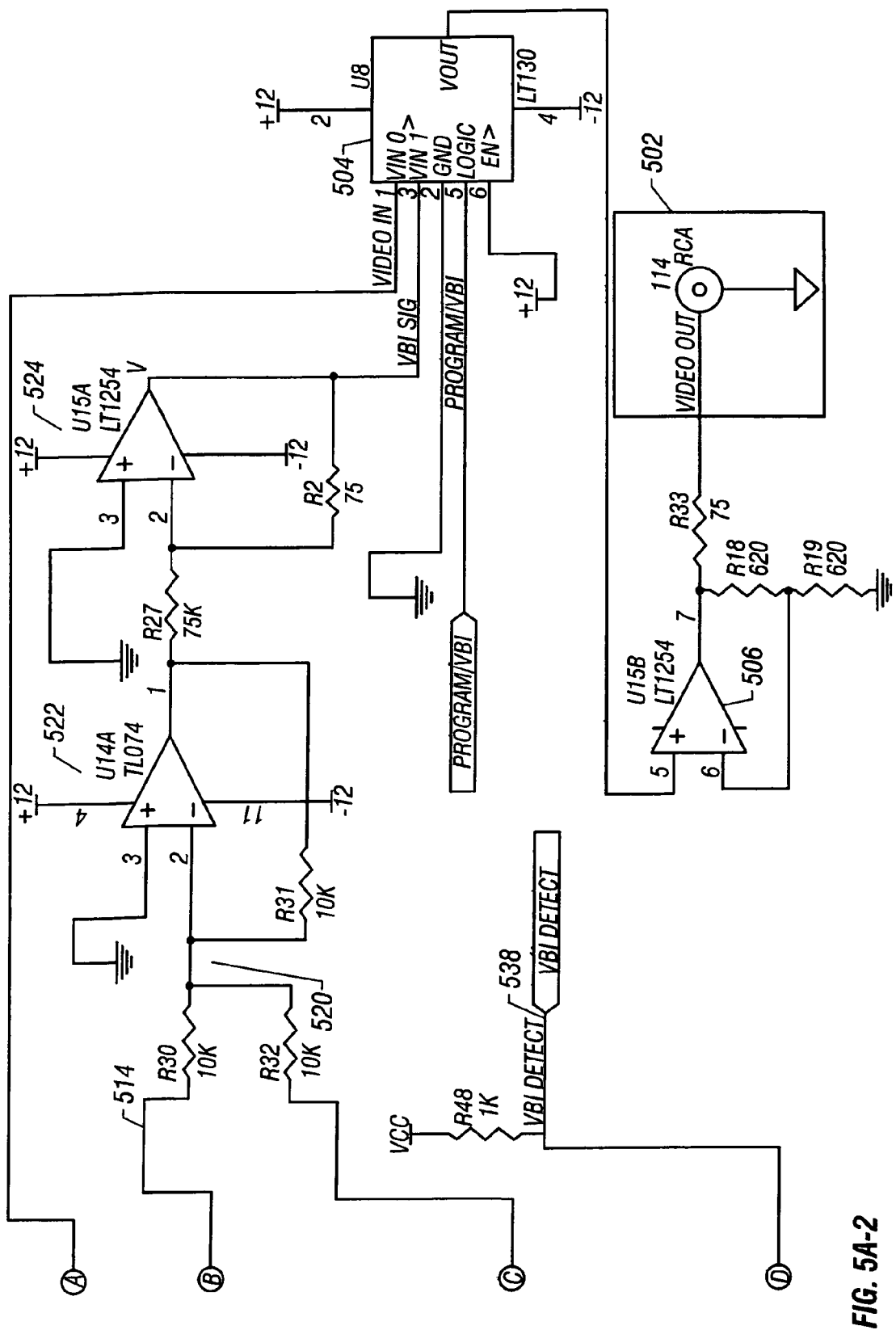
Figures 3, 5A:
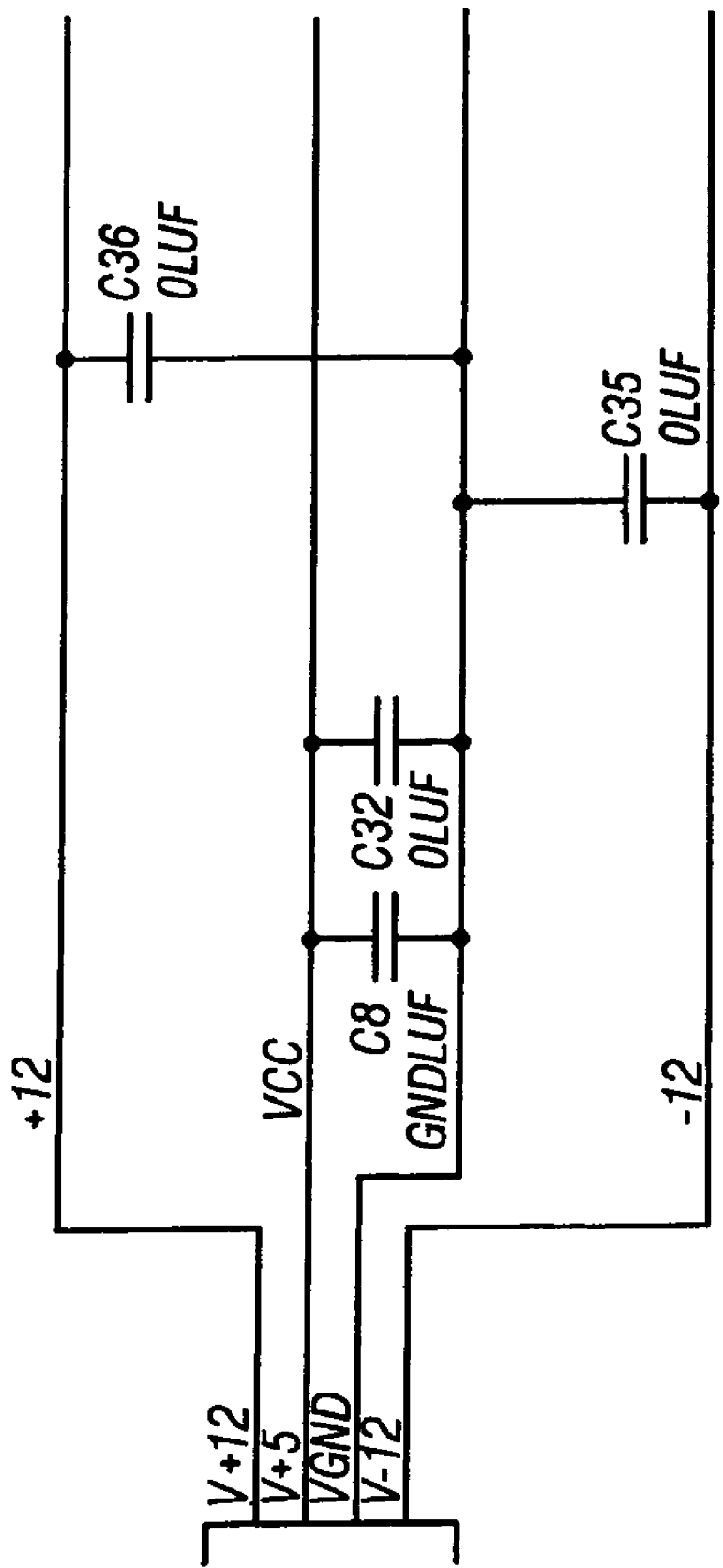
Figures 1, 5B:
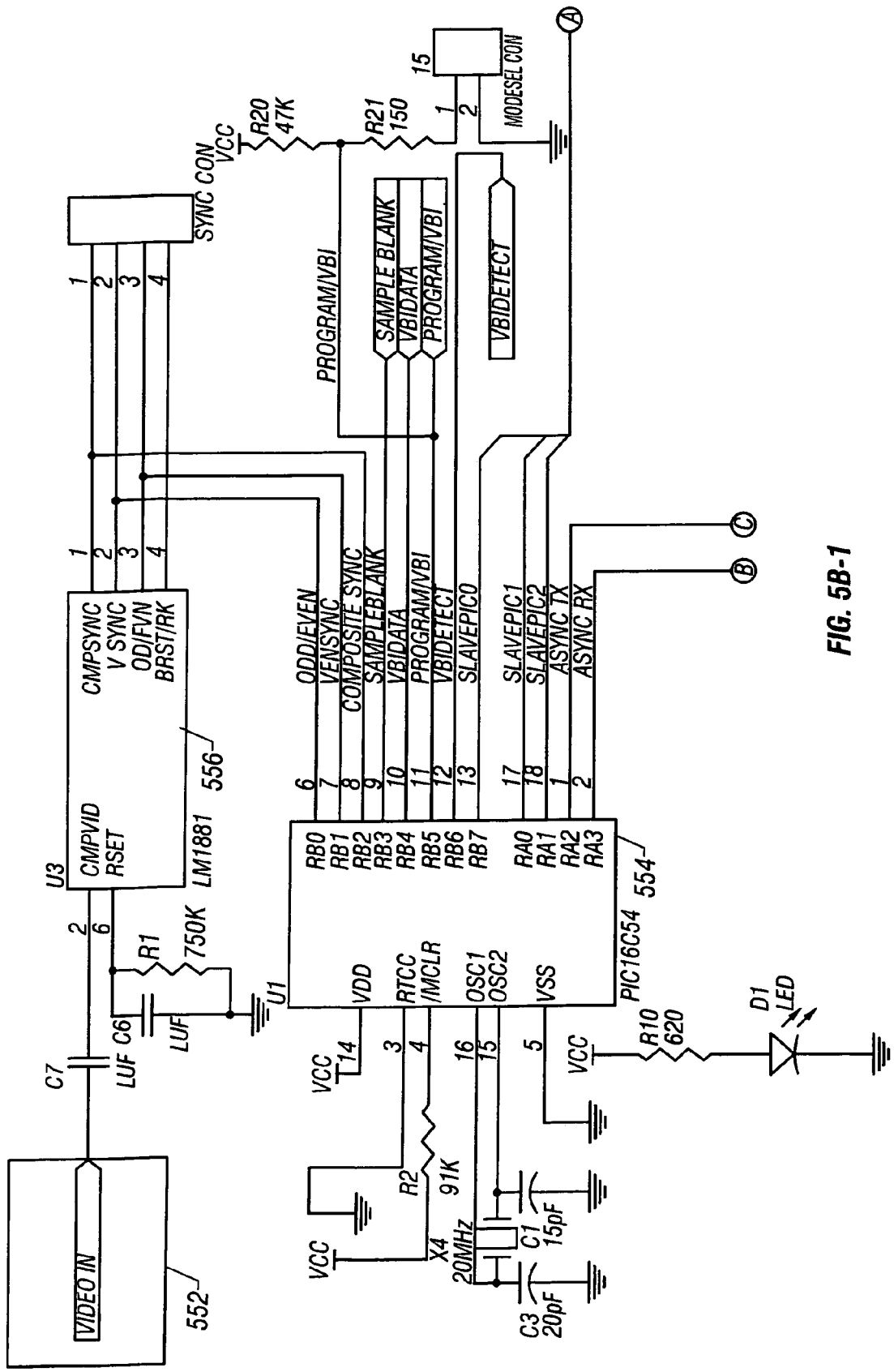
Figures 2, 5B:
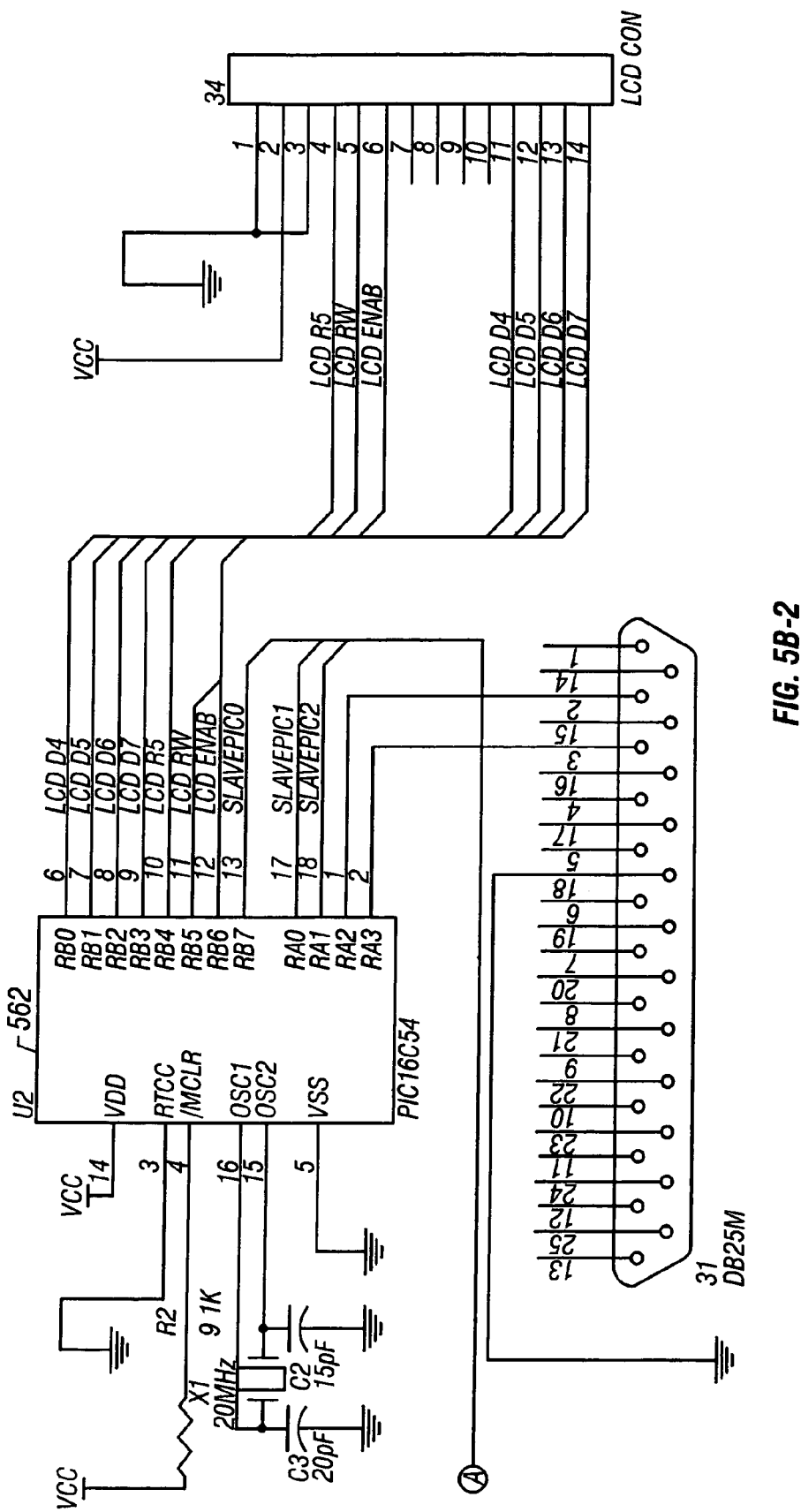
Figures 3, 5B:
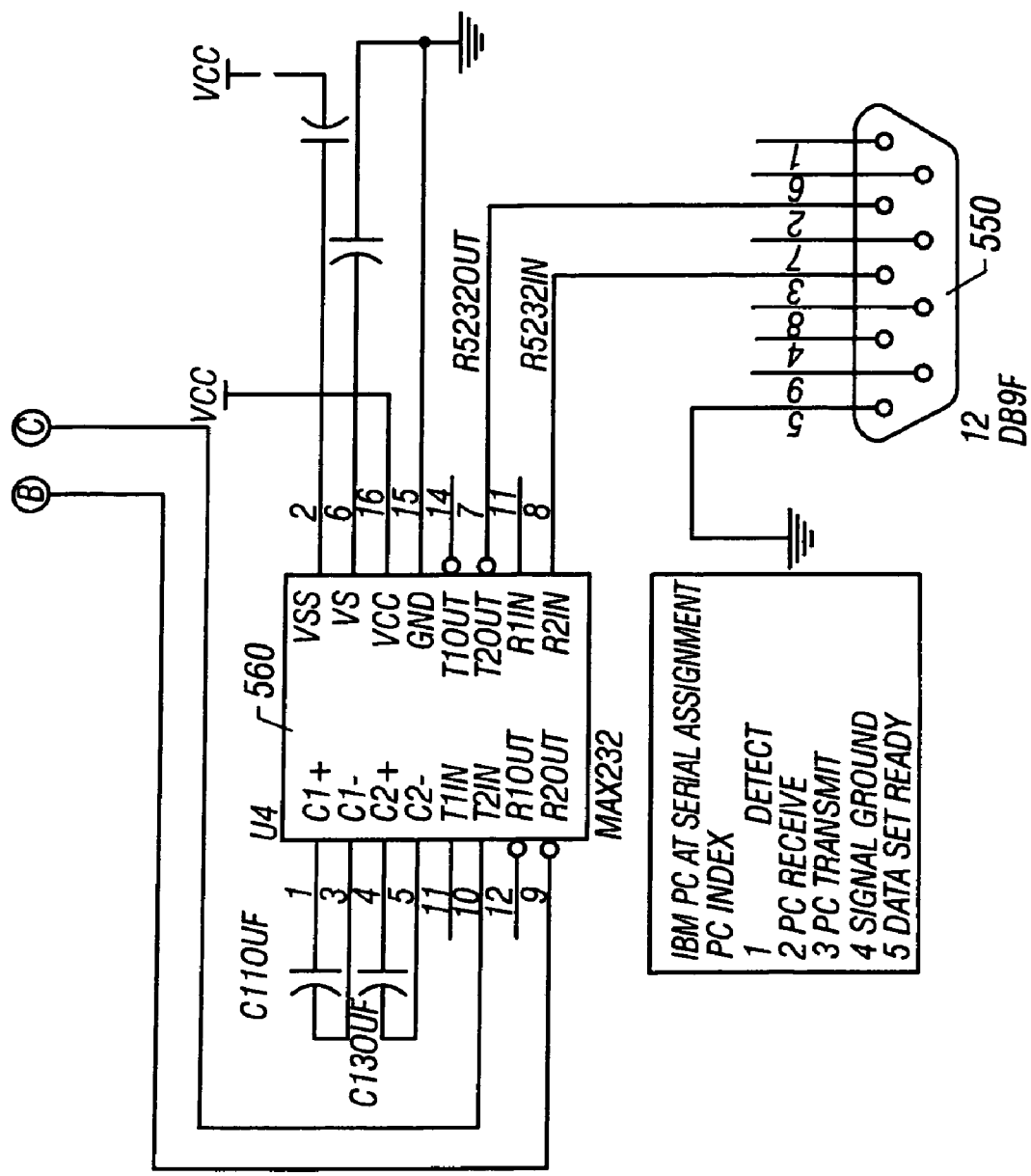

The schematic of FIGS. 5A and 5B shows a schematic which carries out the decoding and encoding. The circuit is encased in potting epoxy for physical security. Also, keys can be held in secure areas of RAM that are not externally readable and are only readable in the microprocessor internals. The video signal is received on the video input port 500. The signal is modified by the elements of the circuit. The modified composite video signal is output through video output port 502. Almost any line can be selected, e.g., line 7.

The circuit in FIGS. 5A and 5B operates both as an encoder and a decoder, based on a software switch. The circuit operates as an encoder to replace a line of video in the vertical blanking interval of an NTSC video signal with a new signal that includes the desired encoded data. FIG. 5B shows the serial port 550 which is connected to a controlling computer. This controlling computer communicates information, including operating commands which are dated and encoded. Data that has been recovered can be sent to the computer, or sent over the modem line to a central billing computer.

Depending on the amount of data that is transmitted, much of the video signal may be simply passed by the circuit from the video input to the video output. The signal that is unchanged passes through video multiplexer 504 to buffer 506 and is finally output by 502. The portions of the video signal which are altered are treated differently.

The video signal is also sent to video-in node 552 in FIG. 5B. The video-in node 552 is coupled to a PIC microprocessor 554 which carries out the various functions of the circuit. This includes monitoring the timing information from an LM 1881 integrated sync separation chip 556. This circuit indicates occurrences of vertical sync, horizontal sync and burst in the NTSC video. The video processor 556 also indicates whether the video currently represents even or odd field of the NTSC frame for use in selecting which field is encoded.

Processor 554 monitors the sync pulses in order to locate the desired portion of the video blanking interval. Each sync pulse represents the start of a new video frame. Therefore, a vertical sync event is taken as a reset for the line count. Each horizontal sync pulse indicates the start of another line of video. The program uses these pulses to count lines until reaching the desired line. This desired line, for example line 7, is the portion of the frame in which this circuit will encode the user data. This portion is called the VBI window. Almost any line can be selected, e.g., line 7. Some lines are used for sending broadcast level information, and the V-chip uses certain lines. We need to avoid these lines. In fact the ADTAG encoder could look for "the first unused line" and simply use that. It would also change which lines it uses.

Figure 6:
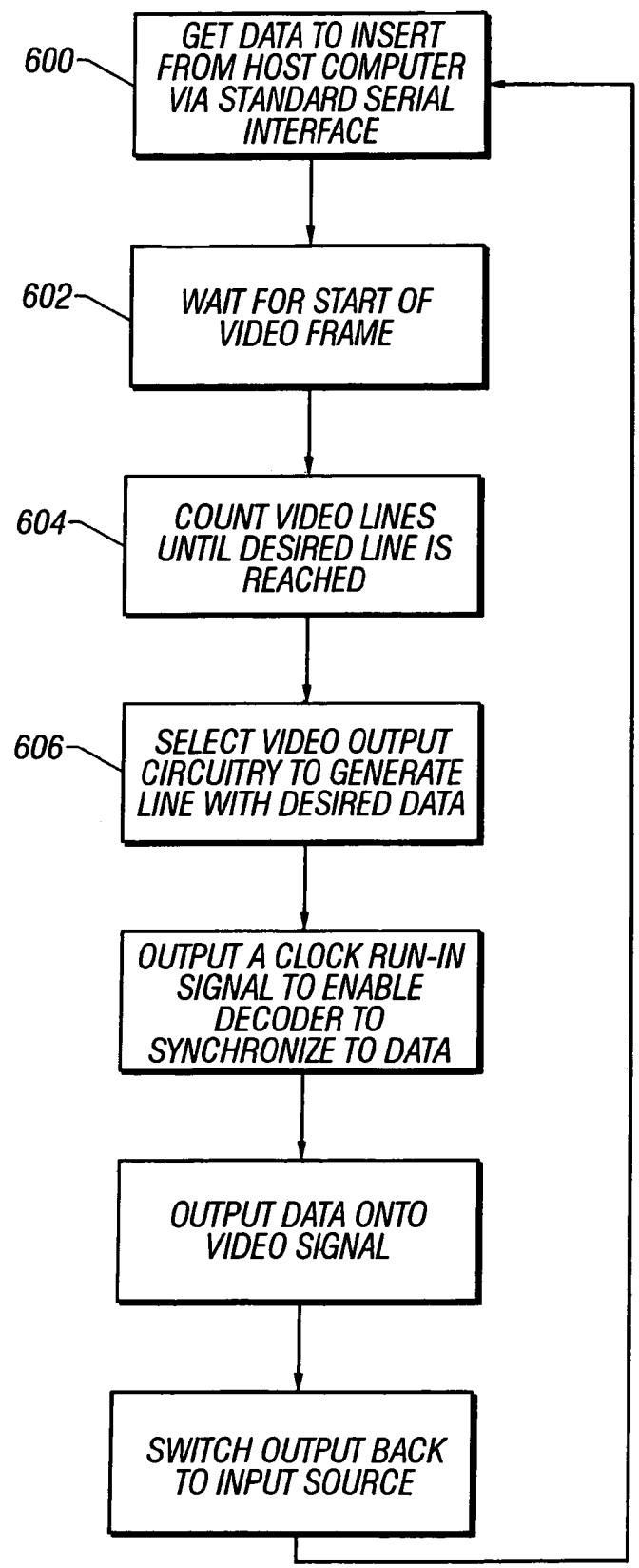
FIG. 6 shows an encoder flow diagram.

The circuit operates according to the flowchart of FIG. 6 to encode information on the video signal. Data is obtained at 600 processor 554 generates a SampleBlank signal which causes a blank level sampling circuit (blank) to sample the blank level. The processor waits for the start of the video frame at 602, then counts lines at 604. Processor 554 also sets the program VBI signal to block the original video signal from passing through video multiplexer U8 during this time. During the time that the program/VBI signal is active, the replacement signal passes through video multiplexer U8.

User data is encoded at step 606 in the flow diagram by generating a representation of the user data on the VBI data line. The preferred mode described herein encodes a digital "0" as the equivalent of a white dot in the video signal and encodes a 0 as a black dot. It is also possible to encode the information in analog form by changing the color levels for example. Processor 554 interfaces to the serial port via serial port driver 560 using a slave microprocessor 562 to carry out appropriate formatting of information including control commands and user data. Serial port driver adjust the signal level from the PIC level used by the PIC microprocessor to a RS 232 communication level. The slave processor 562 can be for example a PCI processor which generates the sequences required to drive the display and interface to the ports.

The SampleBlank signal described above is fed to at least two circuits. SampleBlank is fed to transistor 510 along with the associated circuit 512 including an operational amplifier. When SampleBlank is asserted, the transistor 510 conducts causing capacitor 514 to charge and discharge in equilibrium with the input video signal. When SampleBlank is later deasserted, C2 sees high impedances on the output of transistor and the input of operational amplifier 512.

Blank reference signal is formed by op amp 512 which buffers this signal to a DC voltage to generate the blank reference signal 514 which operates as a reference for the blank. The blank reference signal is combined with the VBI insert signal which has been elsewhere produced and is buffered by op amp circuit 516 and 518. The combined signal at node 520 is further buffered by circuits 522 and 524. These circuits are well known softening circuits which decrease the slopes of the voltage swings in order to avoid false color information.

SampleBlank also feeds transistor 530 and its circuit. The SampleBlank turns on transistor 530 causing it to conduct and thereby bringing the clamped video signal 532 to its low potential. When SampleBlank is deasserted, transistor 530 is commanded to its high impedance state allowing the clamped video signal 532 to track the relative voltage swings of the video signal. For example, therefore, when the clamped video signal is near 0 volts, the output video signal is black representing a zero bit in the user data. At some threshold above zero volts, say two volts, the video signal is encoded as white, representing a digital "1" in the user data.

Circuit 534 forms a threshold detection circuit which compares the input signal 532 with a variable threshold which can be adjusted by potentiometer 536. The output of the potentiometer forms the VBI detect 538 which is used by processor 554.

The above has described the encoding operation. Much of this operation is common for the decoding.

The receiver 144 and code stripper 146 are located at the video transmitting site, to allow the ADTAG information to be stripped off prior to transmission. Data transfer 152 is also affected by the circuit of FIGS. 5A/5B. In view of the similarities of operation, the same circuit of FIGS. 5A/5B is used to decode the information. This allows certain economies and saves on the cost of hardware. The circuit operates as either a decoder or an encoder based on a selection by a switch, a software switch, or an automatic detection of ADTAG information, for example.

Figure 7:
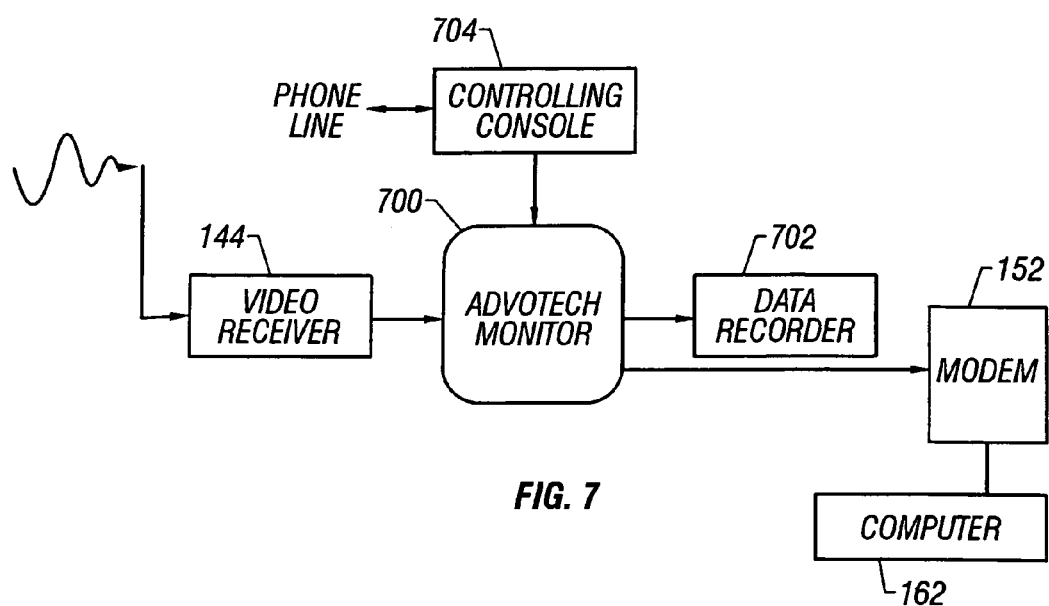
FIG. 7 shows a television monitor system block diagram.

FIG. 7 shows a block diagram of the operation. The information is received by video receiver 144. Monitor 700 includes the structure which strips codes and transfers data. The data is recorded by recorder 702 and also sent by modem 152 to the billing computer 162. The controlling console 704 enables certain systems to be appropriately controlled.

Figure 8:
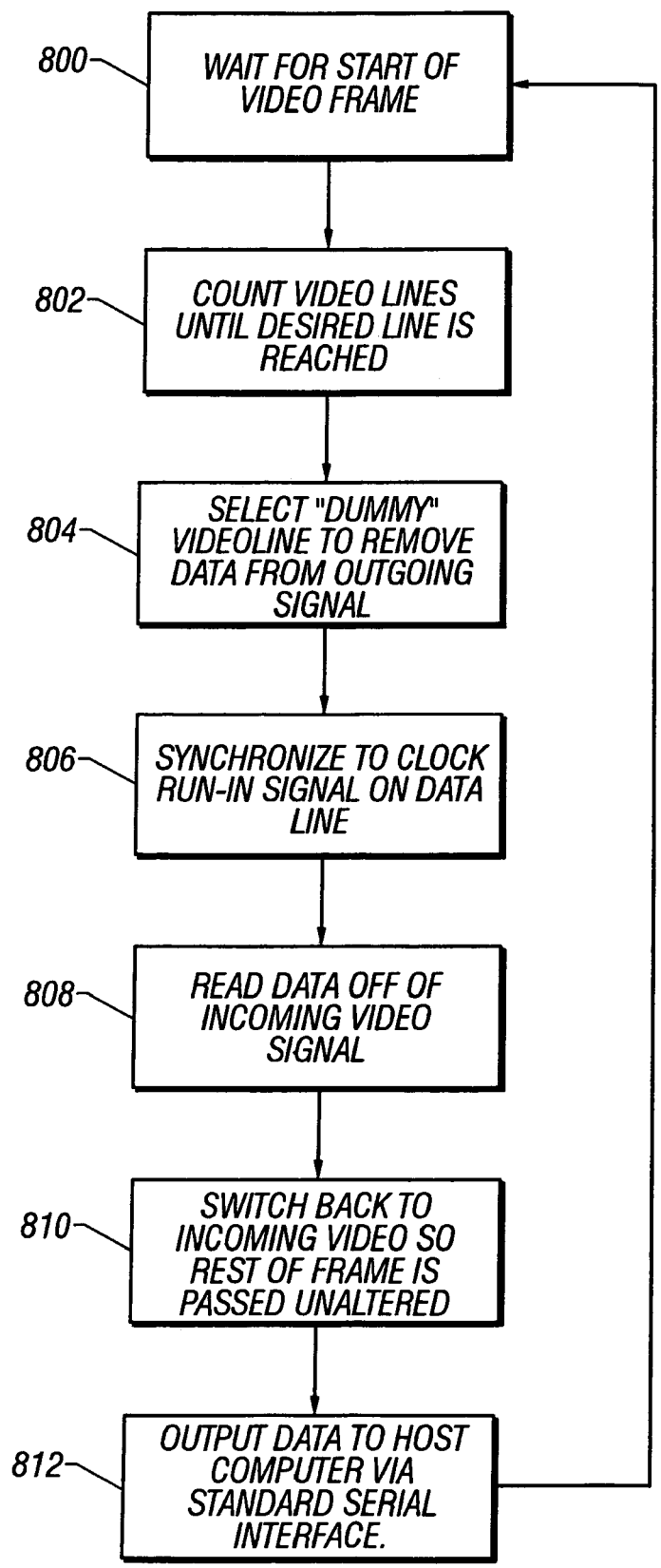
FIG. 8 shows a decoder flow diagram.

As described above, the same system is used, but in this case controlled according to the flow diagram of FIG. 8.

The flow diagram begins at step 800 by determining the beginning of a video frame. Using a similar operation to that discussed above with respect to the encoding, the indication of vertical sync that is produced by processor 554 on its line 7 is used to indicate the beginning of the video frame at step 800. After that, video lines are counted at step 802 by counting each sync pulse. When the desired line is reached, this indicates the beginning of the VBI window. This line is then selected as a dummy at step 804 in order to remove the data from that signal. As described above, white dots are reconstructed as zeros and black dots are reconstructed as ones. This reconstruction is synchronized with a clock at step 806 in order to remove the data. The data is read at step 808 followed by switching back to the incoming video at step 810 to pass the rest of the frame unaltered.

The data thereby stripped off at step 812 is sent via secured communications e.g. by encrypted modem information to the billing computer 162. The ADTAG database computer takes the information received in Chart 2 ("Stripped Information") and matches it to the information entered in Chart 1 ("Booking Information"). If items 1–4 of the booking information match, then items 5–6 are approved and set up for payment. Items 1–4 are time, date, duration, TV station, Advertiser and tape information. Items 5 and 6 are price and ad agency. Payment is then processed by ADTAG by electronic transfer between the banks of the TV station, Ad agency and Advertiser.

The most common errors that occurred are:

Commercial didn't air for the correct length of time (i.e. last 5 seconds were cut off).

Commercial didn't air on the proper date and time.

Stale tape was used.

These errors and additional errors that arise will be processed in a manner pre-established with all parties involved. Payment will be delayed until error is resolved according to these procedures. Some errors may fall in parameters that all entities have approved as acceptable and payment will not be delayed.

For instance a 4 second cut-off may be acceptable and will be paid perhaps accordingly discounted. A 15-second cut-off is not acceptable and will be charged back to the TV station. All error processing will be listed out in contracts signed by all members of the ADTAG clearinghouse.

In addition, errors where no airings occurred, but the booking remains in the ADTAG system will also be resolved on a basis to be established prior to entry to the ADTAG clearinghouse system. Therefore if a booking remains after the air date has passed the advertiser still has a reserve on its credit line that needs to be resolved and reversed.

Security

An important part of the ADTAG system is the use of security to avoid the possibility of fraud. Without security, the system could be fraudulently manipulated.

Figure 4:
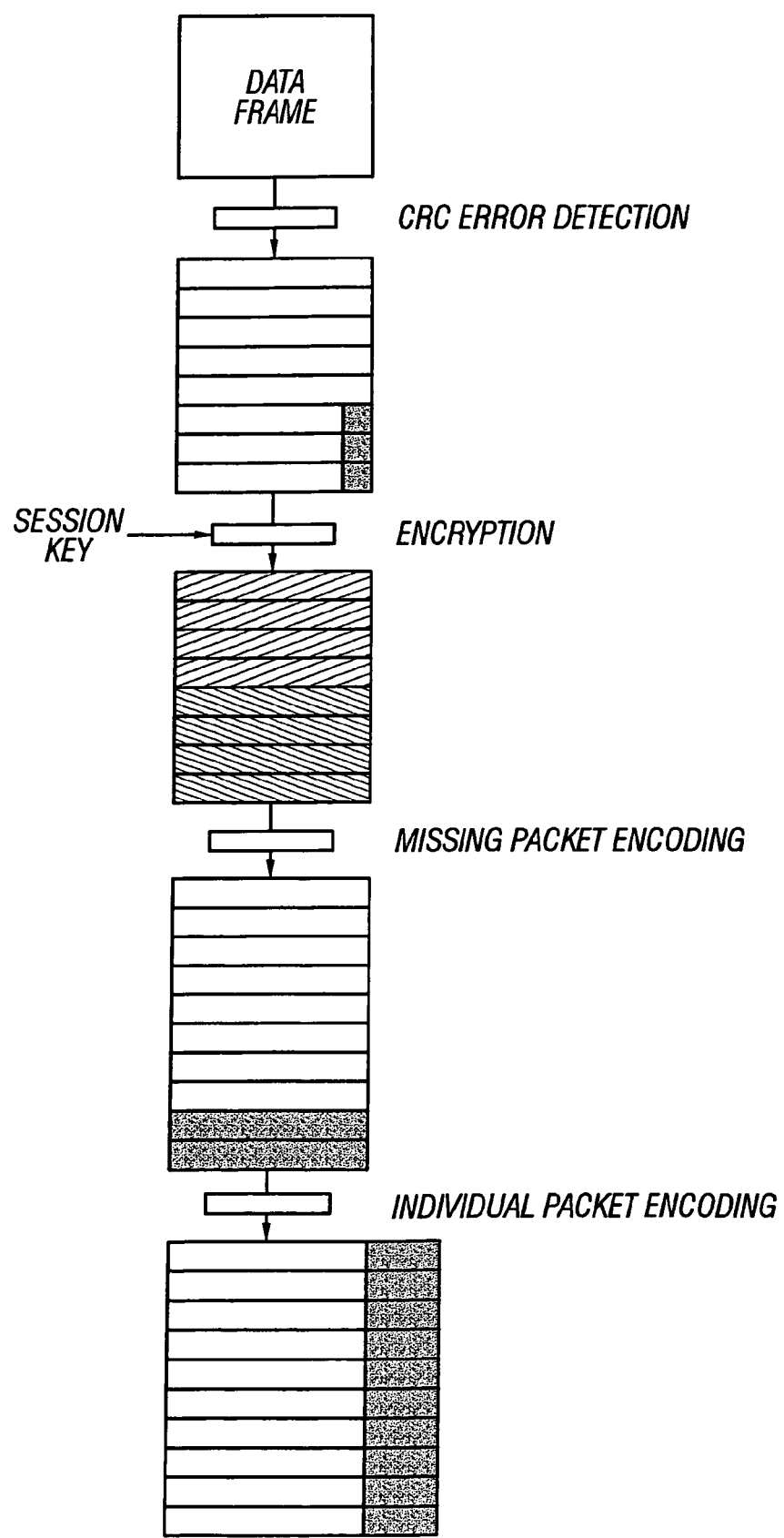
FIG. 4 shows one possible encryption system for encoding.

As shown above, the teletext system provides a basic physical layer protocol for the data transmission. The transport and link layers must be specified in order to encode the data to ensure reliability and privacy. The system uses layering of error detection and correction mechanisms. For example the frames of data are encoded to guard against bad data at the receiver. The data can also be encrypted in block cipher mode using a periodically changing session key and public keying encryption algorithm. The details are shown in FIG. 4.

Figure 9:
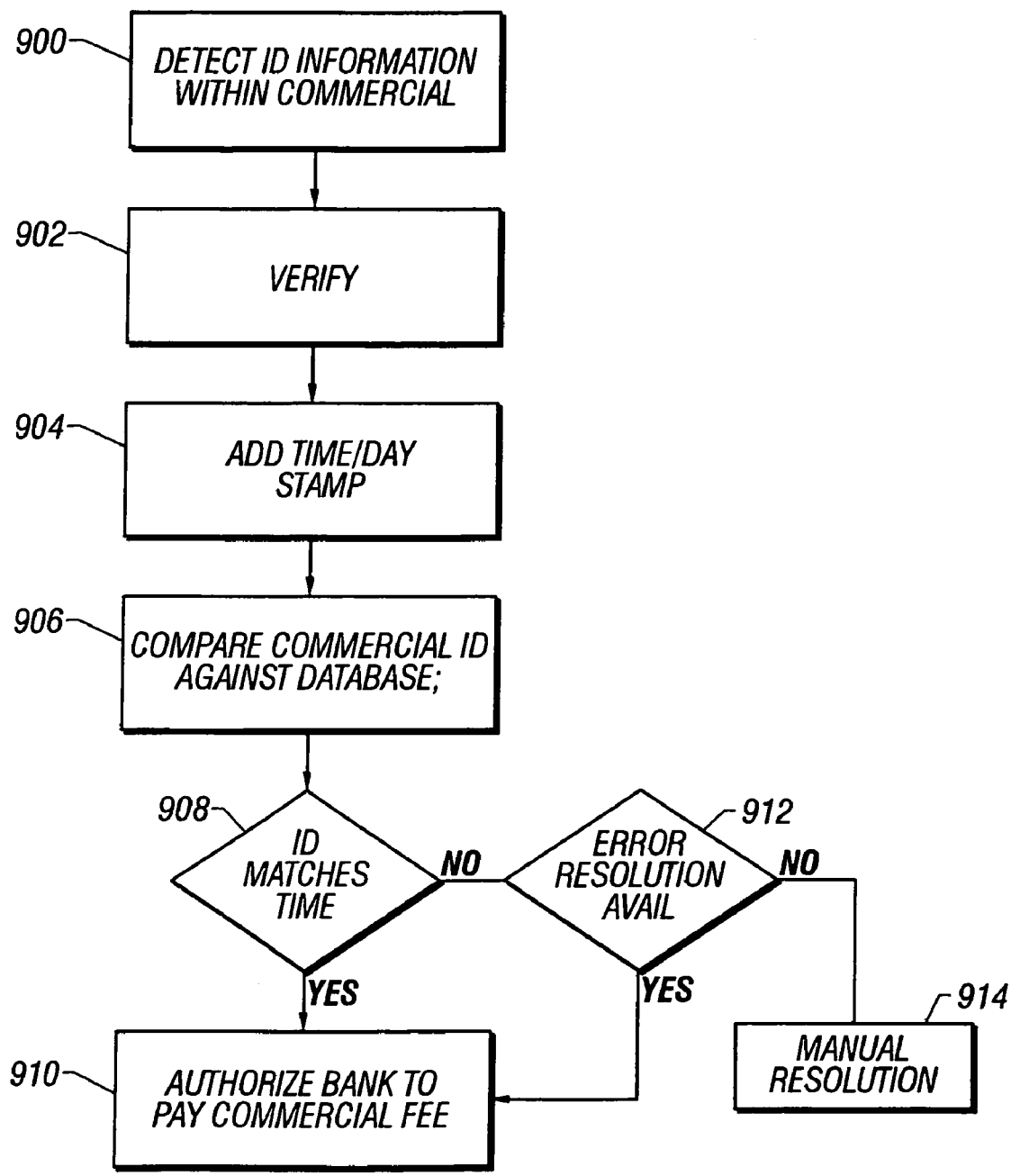
FIG. 9 shows a flowchart of the billing and verification done by the ADTAG system.

FIG. 9 shows a flow chart of operation which corresponds to the verification and authorization described above. Step 900 corresponds to the detecting of identification information within the commercial. As described above, this can correspond to obtaining information in a number of different ways, from a number of different places including but not limited to the vertical blanking interval and the closed captioning locations. Step 902 corresponds to a verification. This verification step can be carried out by operating in a secure premises. In those embodiments that do use a secure premises, the premises itself corresponds to the verification. Verification may include detecting the security of the encryption, correlating the commercial content, or comparing encryption in the vertical blanking with encryption in the closed captioning, for example. If verification is positive, a time and day stamp is added at step 904. This corresponds to a real time indication of when the commercial was actually broadcast.

Step 906 begins the determination of whether the commercial was broadcast when it was supposed to be. First, the commercial identification is compared against the database.

At step 908, an indication of whether the identification matches the time and day when a schedule is determined. If so the bank is authorized to pay the fee for the commercial at 910, since everything was properly done as scheduled.

If not, an error resolution system is determined at step 912. For each client, a separate error resolution system may be in place, or alternatively there could be a number of different error resolution systems which are applicable to different clients. The simplest error resolution system is that the commercial simply did not play. A more difficult scenario is when the commercial did play, but played at the wrong time. A system can, for example, say that when the time differed by a certain amount, that the bill would be reduced by 50%. Other rules which are beyond the scope of this patent application could also be used.

At step 914, the system determines that error resolution is not available, and kicks out the system for manual resolution at that point.

Other modifications are within the disclosed embodiment. For example, other media including radio, cable, and others are contemplated.

The invention claimed is:

1. A method of scheduling and paying for advertising comprising:

booking a advertising segment with an advertising agency, said booking comprising determining time, network, pricing and commission parameters for said advertising segment;

Establishing an account with a clearinghouse, said clearinghouse determining if the advertising segment actually aired at the specified time by automatically detecting a code on the advertising segment and verifying security of said code; and said clearinghouse automatically authorizing payment if said advertising segment played at the specified time and automatically authorizing an error resolution procedure if the advertising segment played at other than the specified time wherein said security comprises information on the advertising segment correlated with content of the advertising segment, and wherein said information correlated with the advertisement comprises information indicative of an average brightness of at least part of the advertising segment.

* * * * *